(12) United States Patent  
Mori

(10) Patent No.: US 10,044,313 B2  
(45) Date of Patent: Aug. 7, 2018

(54) VOLTAGE CONTROL APPARATUS, MOTOR UNIT, IMAGE FORMING APPARATUS AND VOLTAGE CONTROL METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Shinya Mori, Numazu (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 169 days.

(21) Appl. No.: 14/328,852

(22) Filed: Jul. 11, 2014

(65) Prior Publication Data

US 2016/0013748 A1    Jan. 14, 2016

(51) Int. Cl.
```
H02P 1/00      (2006.01)
H02M 7/48      (2007.01)
H02P 27/08     (2006.01)
H02M 7/5387    (2007.01)
H02M 1/00      (2006.01)
```

(52) U.S. Cl.
CPC ........ *H02P 27/08* (2013.01); *H02M 7/53873* (2013.01); *H02M 2001/0012* (2013.01); *H02M 2001/0025* (2013.01); *H02M 2001/0093* (2013.01)

(58) Field of Classification Search
CPC .. H02P 27/06; H02P 27/00; H02P 8/00; H02P 7/29; H02M 3/156; H01J 2237/24564; B65H 2555/26

USPC ............... 318/504, 494, 696, 811; 388/847; 400/225
See application file for complete search history.

(56) References Cited

U.S. PATENT DOCUMENTS

| | | | | |
|---|---|---|---|---|
| 4,438,376 A | * | 3/1984 | Varnovitsky | H02P 27/08 318/78 |
| 5,625,269 A | * | 4/1997 | Ikeda | H02P 8/14 318/400.34 |
| 6,330,279 B1 | * | 12/2001 | Belser | H03F 3/087 375/238 |
| 2004/0229582 A1 | * | 11/2004 | Miyasita | H03F 3/45197 455/136 |

(Continued)

*Primary Examiner* — Bentsu Ro  
*Assistant Examiner* — Zemenay Truneh  
(74) *Attorney, Agent, or Firm* — Amin, Turocy & Watson LLP

(57) ABSTRACT

In accordance with one embodiment, a voltage control apparatus comprises a pulse width control section, a pulse width modulation wave generation section, a variable amplifier control section and a variable amplifier. The pulse width control section specifies the pulse width of the pulse width modulation wave. The pulse width modulation wave generation section generates a pulse width modulation wave having the pulse width specified by the pulse width control section. The variable amplifier control section generates a GAIN signal for scaling up/down the pulse width modulation wave generated by the pulse width modulation wave generation section. The variable amplifier scales up/down the pulse width modulation wave generated by the pulse width modulation wave generation section according to the GAIN signal generated by the variable amplifier control section and outputs the scaled up/down the pulse width modulation wave.

7 Claims, 6 Drawing Sheets

(56) References Cited

U.S. PATENT DOCUMENTS

| | | | |
|---|---|---|---|
| 2007/0138984 A1* | 6/2007 | Yang | H02P 6/26 |
| | | | 318/400.04 |
| 2009/0045762 A1* | 2/2009 | Hayashi | H02P 7/29 |
| | | | 318/379 |
| 2009/0097287 A1* | 4/2009 | Furuchi | H02M 7/53873 |
| | | | 363/71 |
| 2012/0120136 A1* | 5/2012 | Oshima | B41J 2/04541 |
| | | | 347/10 |

* cited by examiner

VOLTAGE CONTROL APPARATUS, MOTOR UNIT, IMAGE FORMING APPARATUS AND VOLTAGE CONTROL METHOD

FIELD

Embodiments described herein relate to a voltage control apparatus, a motor unit, an image forming apparatus and a voltage control method.

BACKGROUND

A Voltage control apparatus is known which controls a voltage using a PWM (Pulse Width Modulation) wave. The voltage control apparatus controls the pulse width of the PWM wave to control the voltage. The PWM wave sent by the voltage control apparatus is smoothed by a low-pass filter and then sent to an external apparatus as a reference voltage. Conventionally, to control a voltage in detail, a voltage control apparatus needs to increase bits representing a pulse width.

DETAILED DESCRIPTION

In accordance with one embodiment, a voltage control apparatus comprises a pulse width control section, a pulse width modulation wave generation section, a variable amplifier control section and a variable amplifier. The pulse width control section specifies the pulse width of a pulse width modulation wave. The pulse width modulation wave generation section generates a pulse width modulation wave having the pulse width specified by the pulse width control section. The variable amplifier control section generates a GAIN signal for scaling up/down the pulse width modulation wave generated by the pulse width modulation wave generation section. The variable amplifier scales up/down the pulse width modulation wave generated by the pulse width modulation wave generation section according to the GAIN signal generated by the variable amplifier control section and outputs the scaled up/down pulse width modulation wave.

Embodiments of the present invention are described below with reference to the accompanying drawings.

Figure 1:
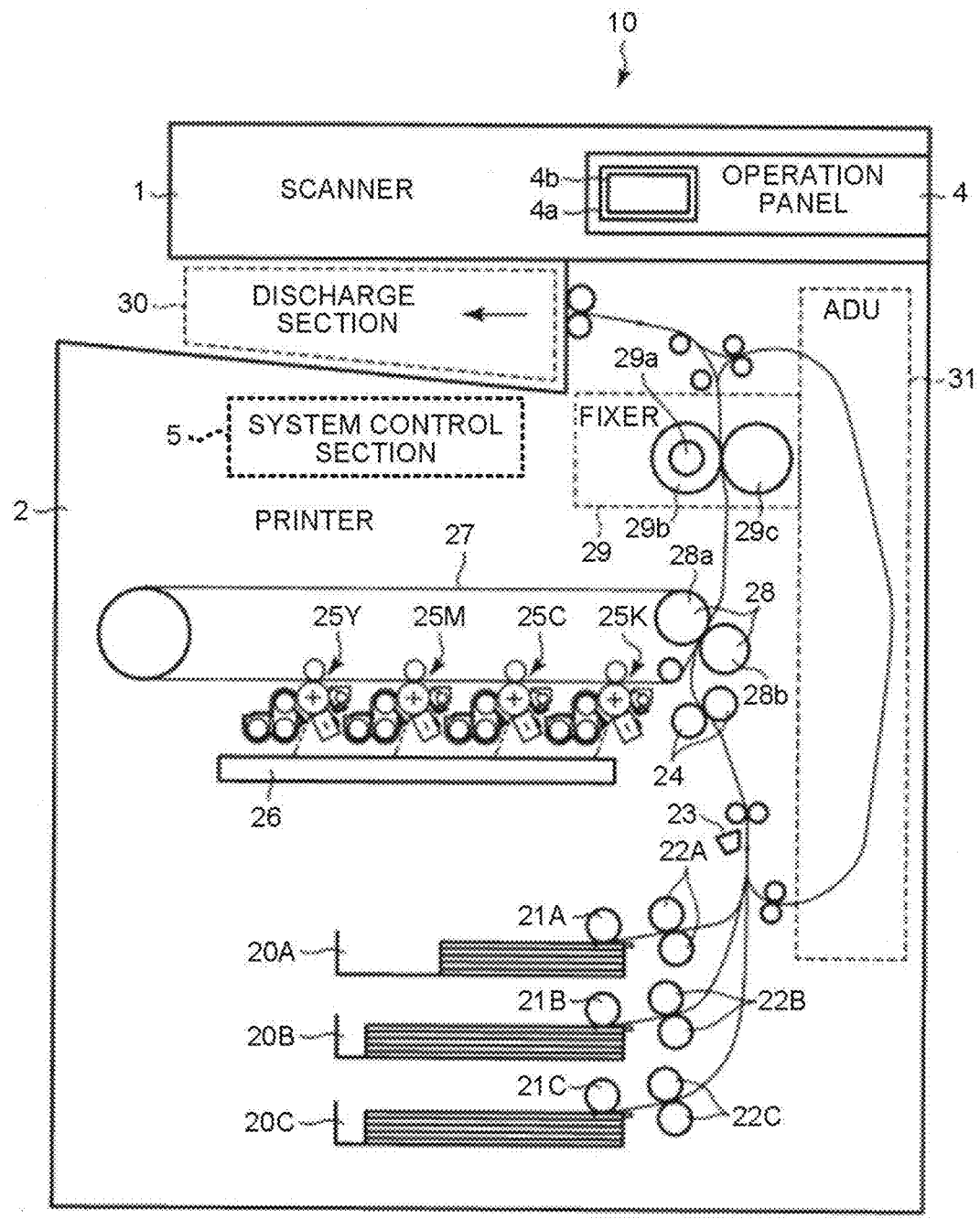
FIG. 1 is a cross-sectional view illustrating an example of a digital multi-functional peripheral according to an embodiment.

FIG. 1 is a cross-sectional view schematically illustrating a configuration example of a digital multi-functional peripheral 10 according to an embodiment. The digital multi-functional peripheral 10 according to the present embodiment functions as an image forming apparatus. As shown in FIG. 1, the digital multi-functional peripheral 10 comprises a scanner 1, a printer 2, an operation panel 4 and a system control section 5.

The scanner 1, which is a device for reading the image of a document and converting the image into image data, consists of, for example, a CCD line sensor which converts the image in the read side of a document into image data and the like. The scanner 1 may also be a device for scanning a document placed on the glass of a document table or a device for reading the image of the document fed from an ADF (Auto Document Feeder). Further, the scanner 1 having a function of detecting the size of a document (document detection function) is arranged, for example, on the upper part of the main body of the digital multi-functional peripheral 10. The scanner 1 is controlled by the system control section 5. The scanner 1 outputs the image data of a document to the system control section 5.

The printer 2 (image forming apparatus) forms an image on a paper serving as an image formed medium. The printer 2 serving as an image forming apparatus has a color printing function of printing a color image on a paper and a monochrome printing function of printing a monochrome (e.g. black) image on a paper. For example, the printer 2 is an electrophotographic type image forming apparatus. The printer 2 forms a color image using a multi-color (e.g. Yellow (Y)-Cyan (C)-Magenta (M)) toner. Further, the printer 2 forms a monochrome image using a monochrome (e.g. black) toner. The printer 2 can be any image forming apparatus that has a color printing function and a monochrome printing function but is not limited to an electrophotographic type image forming apparatus. For example, the printer 2 may be an inkjet type image forming apparatus or a thermal type image forming apparatus.

In the configuration example shown in FIG. 1, the printer 2 comprises a paper feed cassette 20 (20A, 20B, 20C), which is a paper feed section for feeding a paper on which an image is to be printed. Further, the printer 2 may comprise a manual tray and the like as a paper feed section. For example, each paper feed cassette 20A, 20B or 20C can be detachably arranged on the lower part of the main body of the digital multi-functional peripheral 10. The paper feed cassettes 20A, 20B and 20C accommodate different kinds (e.g. sizes, materials) of paper set respectively.

Setting information, including information related to the paper accommodated in each paper feed cassette, is stored in a non-volatile memory. The printer 2 selects a paper feed cassette for accommodating a paper to be used in a printing process according to the setting information. The printer 2 prints an image on a paper fed from the selected paper feed cassette. Further, in a case where the printer 2 is provided with a manual tray, the setting information is also stored in a non-volatile memory for the manual tray, like for each paper feed cassette.

The paper feed cassettes 20A, 20B and 20C are provided with pickup rollers 21A, 21B and 21C, respectively. The pickup rollers 21A, 21B and 21C pick up, one by one, papers from the paper feed cassettes 20A, 20B and 20C. The pickup rollers 21A, 21B and 21C feed the picked up paper to a conveyance path (conveyance section) 22 consisting of a plurality of conveyance rollers. Neither the number of the paper feed cassettes serving as a paper feed section nor the number of the pickup rollers is limited to 3. For example, one, two or more than 4 paper feed cassettes or pickup rollers may be configured. Further, in addition to cassettes, a manual tray may be arranged as a paper feed section.

The conveyance section 22 conveys a paper inside the printer 2. The conveyance section 22 conveys the paper fed from the pickup rollers 21A, 21B and 21C to a register roller 24, which conveys the paper to a transfer position at the timing when an image is transferred onto the paper from an intermediate transfer belt 27.

An image forming section 25 (25Y, 25M, 25C and 25K), an exposure section 26, the intermediate transfer belt 27 and a transfer section 28 serve as an image forming module for forming an image. The image forming section 25 (25Y, 25M, 25C and 25K) forms an image to be transferred on a paper. In the configuration example shown in FIG. 1, the image forming section 25Y forms an image with a yellow toner. The image forming section 25M forms an image with a magenta toner. The image forming section 25C forms an image with a cyan toner. The image forming section 25K forms an image with a black toner. The image forming section 25 (25Y, 25M, 25C and 25K) transfers the images of different colors on the intermediate transfer belt 27 in an overlapped manner, thereby forming a color image on the intermediate transfer belt 27.

The exposure section 26 forms, using laser light, an electrostatic latent image on the photoconductive drum (image carrier) of each image forming section 25 (25Y, 25M, 25C and 25K). The exposure section 26 irradiates, using an optical system such as a polygonal mirror, the photoconductive drum with laser light controlled according to image data. The laser light from the exposure section 26 forms an electrostatic latent image on the surface of each photoconductive drum. The exposure section 26 controls laser light according to a control signal from the system control section 5. The electrostatic latent images formed on the photoconductive drums are images developed using toners of different colors. For example, the exposure section 26 controls the laser light power according to a control signal from the system control section 5. Further, the exposure section 26 controls a modulation quantity for controlling the light-emitting pulse width of laser light according to a control signal from the system control section 5.

Each image forming section 25 (25Y, 25M, 25C and 25K) develops the electrostatic latent images formed on each photoconductive drum using toners of different colors. Each image forming section 25 (25Y, 25M, 25C and 25K) forms a toner image serving as a visible image on the photoconductive drum. The intermediate transfer belt 27 is an intermediate transfer body. Each image forming section 25 (25Y, 25M, 25C and 25K) transfers (primary transfer) the toner images formed on the photoconductive drums onto the intermediate transfer belt 27. Each image forming section 25 (25Y, 25M, 25C and 25K) applies a transfer bias to the toner images at a first transfer position. Each image forming section 25 (25Y, 25M, 25C and 25K) controls the transfer bias according to a transfer current. The toner image on each photoconductive drum is transferred onto the intermediate transfer belt 27 through the transfer bias at each transfer position. The system control section 5 controls the transfer current used by each image forming section during the primary transfer processing.

Further, each of the image forming sections 25Y, 25M, 25C and 25K is provided with a potential sensor and a concentration sensor. The potential sensor is a sensor which detects the surface potential of the photoconductive drum. In each of the image forming sections 25Y, 25M, 25C and 25K, an electrostatic charger charges the surface of the photoconductive drum before the photoconductive drum is exposed by the exposure section 26. The system control section 5 is capable of changing the charging condition of the electrostatic charger. The potential sensor detects the surface potential of the photoconductive drum the surface of which is charged by the electrostatic charger. The concentration sensor detects the concentration of the toner image transferred on the intermediate transfer belt 27. Further, the concentration sensor may detect the toner image formed on the photoconductive drum as well.

For example, in a case of forming a monochrome image, the image forming section 25K transfers (primarily transfers) the toner image (visible image) developed using a black (monochrome) toner onto the intermediate transfer belt 27. Consequentially, the intermediate transfer belt 27 retains the monochrome image formed with the black (monochrome) toner.

Further, in a case of forming a color image, each of the image forming sections 25Y, 25M, 25C and 25K transfers (primarily transfers) the toner images (visible images) developed using toners of different colors (yellow, magenta, cyan and black) onto the intermediate transfer belt 27 in an overlapped manner. Consequentially, the intermediate transfer belt 27 retains the color image overlapped by the toner images of different colors.

The transfer section 28 transfers the toner image on the intermediate transfer belt 27 to a paper at a secondary transfer position where the toner images on the intermediate transfer belt 27 are transferred onto a paper. The secondary transfer position is a position where a backup roller 28a is opposite to a secondary transfer roller 28b. The transfer section 28 applies a transfer bias controlled by a transfer current at the secondary transfer position. The transfer section 28 transfers the toner images (color-erasable toner images or ordinary toner images) on the intermediate transfer belt 27 to a paper through the transfer bias. The system control section 5 controls the transfer current used in a secondary transfer processing. For example, the system control section 5 may respectively control a transfer current for transferring a color-erasable toner image and a transfer current for transferring an ordinary toner image.

A fixer 29 has a function of fixing toner on a paper. For example, in the embodiments described herein, it is assumed that the fixer 29 fixes a toner image on a paper by heating the paper. However, the fixer 29 can fix an image on a paper in any way as long as the image can be fixed on the paper but is not limited to fix the image by heating.

The fixer 29 is configured to heat a paper to carry out a fixing processing. In the configuration example shown in FIG. 1, the fixer 29 consists of a heat roller 29b in which a heating section 29a is arranged and a press roller 29c which, when pressed, is connected with a fixing belt heated by the heat roller 29b. The heating section 29a can be any heater that is capable of controlling temperature. For example, the heating section 29a may consist of a heater lamp such as a halogen lamp or an induction heating (IH) type heater. Further, the heating section 29a may consist of a plurality of heaters.

For example, in a case of carrying out a fixing processing, i. e., fixing a toner image on a paper, the system control section 5 controls the fixing temperature of the fixer 29. The fixer 29 the fixing temperature of which is controlled presses the paper on which a toner image is transferred by the transfer section 28 while heating the paper at the fixing temperature. In this way, the fixer 29 fixes the toner image on the paper. Further, the fixer 29 conveys the paper on which the toner image is fixed to either of a paper discharge section 30 and an ADU 31.

The paper on which the toner image is fixed by the fixer 29 is discharged to the paper discharge section 30. Further, if an image is also formed on the back of the paper on which the toner image is fixed by the fixer 29, the paper is temporarily conveyed to the side of the paper discharge section 30 and then switched back to the ADU 31. In this case, the ADU 31 feeds the paper reversed through the switch-back to the front of the register roller 24 again.

The operation panel 4, which is a user interface, has a display section 4a provided with various buttons and a touch panel 4b. The system control section 5 controls the content displayed on the display section 4a of the operation panel 4. Further, the operation panel 4 outputs the information input from the touch panel 4b or buttons of the display section 4a to the system control section 5. The user designates an operation mode or inputs information such as setting information on the operation panel 4. For example, the user designates a specific paper feed cassette (paper feed section) a black (monochrome) dedicated cassette through the operation panel 4. Here, it is assumed that the black (monochrome) dedicated cassette is a cassette (paper feed section) dedicated to monochrome (black) printing and forbidden to be used in color printing.

Next, a configuration example of the digital multi-functional peripheral 10 is described.

Figure 2:
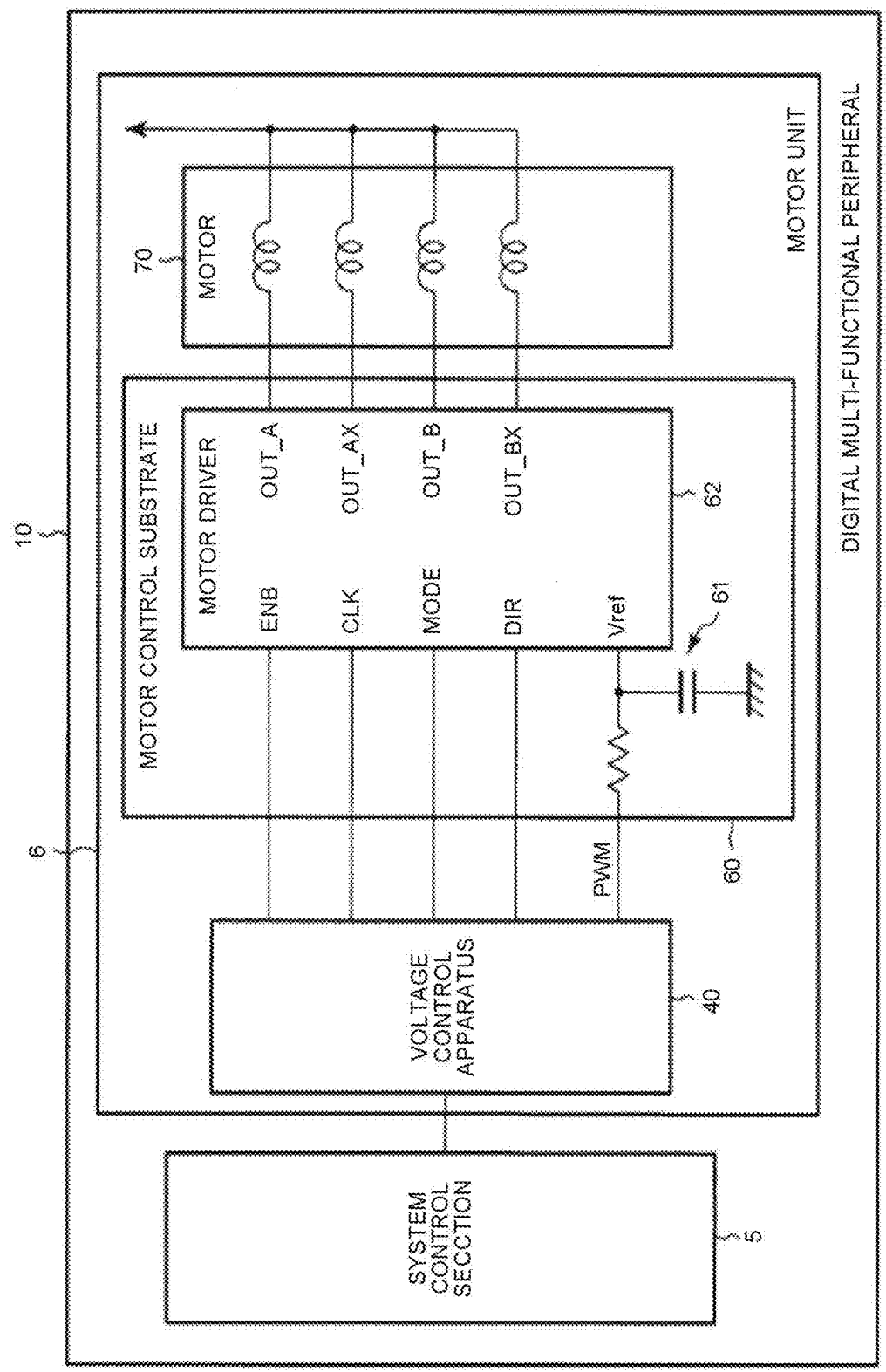
FIG. 2 is a block diagram illustrating a configuration example of a digital multi-functional peripheral according to the embodiment.

FIG. 2 is a diagram illustrating a configuration example of the digital multi-functional peripheral 10 according to the embodiment.

For the sake of simplification, FIG. 2 shows the system control section 5 and a motor unit 6.

As shown in FIG. 2, the digital multi-functional peripheral 10 comprises the system control section 5 and the motor unit 6.

According to an instruction from the system control section 5, the motor unit 6 drives various motors including a paper conveyance motor for conveying papers, a motor for rotating a heater roller 29b and a motor for rotating a photoconductive drum.

As shown in FIG. 2, the motor unit 6 comprises a voltage control apparatus 40, a motor control substrate 60 and a motor 70.

The voltage control apparatus 40 controls the current flowing in the motor 70. For example, when the motor 70 accelerates or decelerates, the voltage control apparatus 40 sets the current flowing to the motor 70 to be a high value. Further, when the motor 70 rotates at a given speed, the voltage control apparatus 40 sets the current flowing to the motor 70 to be a low value. Further, the current value set by the voltage control apparatus 40 is not limited to a specific value.

The voltage control apparatus 40 outputs a PWM wave (pulse width modulation wave) to control the current flowing in the motor 70. The voltage control apparatus 40 is capable of adjusting the pulse width and the voltage of the PWM wave.

Further, the voltage control apparatus 40 sends various control signals to a motor driver 62.

The voltage control apparatus 40 is described in detail later.

The motor control substrate 60 controls the current flowing to each phase of the motor 70 according to an instruction from the voltage control apparatus 40.

The motor control substrate 60 comprises a low-pass filter 61 and the motor driver 62.

The low-pass filter 61 is arranged between the voltage control apparatus 40 and the motor driver 62. The low-pass filter 61 smooths the PWM wave output from the voltage control apparatus 40 to generate a reference voltage Vref and applies the generated reference voltage Vref to the motor driver 62. The low-pass filter 61 consists of, for example, resistance, condenser and the like.

The motor driver 62 controls the current flowing in each phase of the motor 70 according to the various control signals sent from the voltage control apparatus 40 and the reference voltage Vref generated by the low-pass filter 61.

The motor driver 62 sets an upper limit for the current flowing in each phase of the motor 70 according to the reference voltage Vref. For example, the greater the reference voltage Vref is, the higher the current value set by the motor driver 62 as the current flowing in each phase of the motor 70 is. Further, the current value set by the motor driver 62 according to the reference voltage Vref is not limited to a specific one.

Further, the motor driver 62 receives an ENB signal, a CLK signal, a MODE signal, a DIR signal and the like from the voltage control apparatus 40.

The ENB signal is a signal for determining the ON/OFF of the motor 70.

The CLK signal is a clock signal used by the motor driver 62.

The MODE signal is a signal for setting an excitation mode of the motor 70. For example, as the excitation mode of the motor 70, the MODE signal sets a two-phase excitation mode or a one-two phase excitation mode.

The DIR signal is a signal for determining the rotation direction of the motor 70.

The motor driver 62 outputs, according to each aforementioned signal, a current to each phase connected with OUT_A, OUT_AX, OUT_B and OUT_BX.

The motor 70 provided with a rotor and a plurality of phases which current flows. The rotor of the motor 70 is rotated through the current flowing to each phase. Each stage of the motor 70 is electrically connected with the OUT_A, OUT_AX, OUT_B and OUT_BX of the motor driver 62. That is, the motor 70 is driven by the current output to each phase thereof by the motor driver 62.

The motor 70 is a motor for driving the drive section of each section of the digital multi-functional peripheral 10. For example, the motor 70 is a pickup motor 21, a motor for driving the conveyance section 22, a register motor 24, a motor for driving the secondary transfer roller 28b, a motor for driving the heater roller 29b, a motor for driving the press roller 29c or a motor for driving a photoconductive drum and the like. Further, the motor 70 may also be a motor for moving the sensor in the scanner 1.

For example, the motor 70 is a stepping motor.

Next, the voltage control apparatus 40 is described below.

Figure 3:
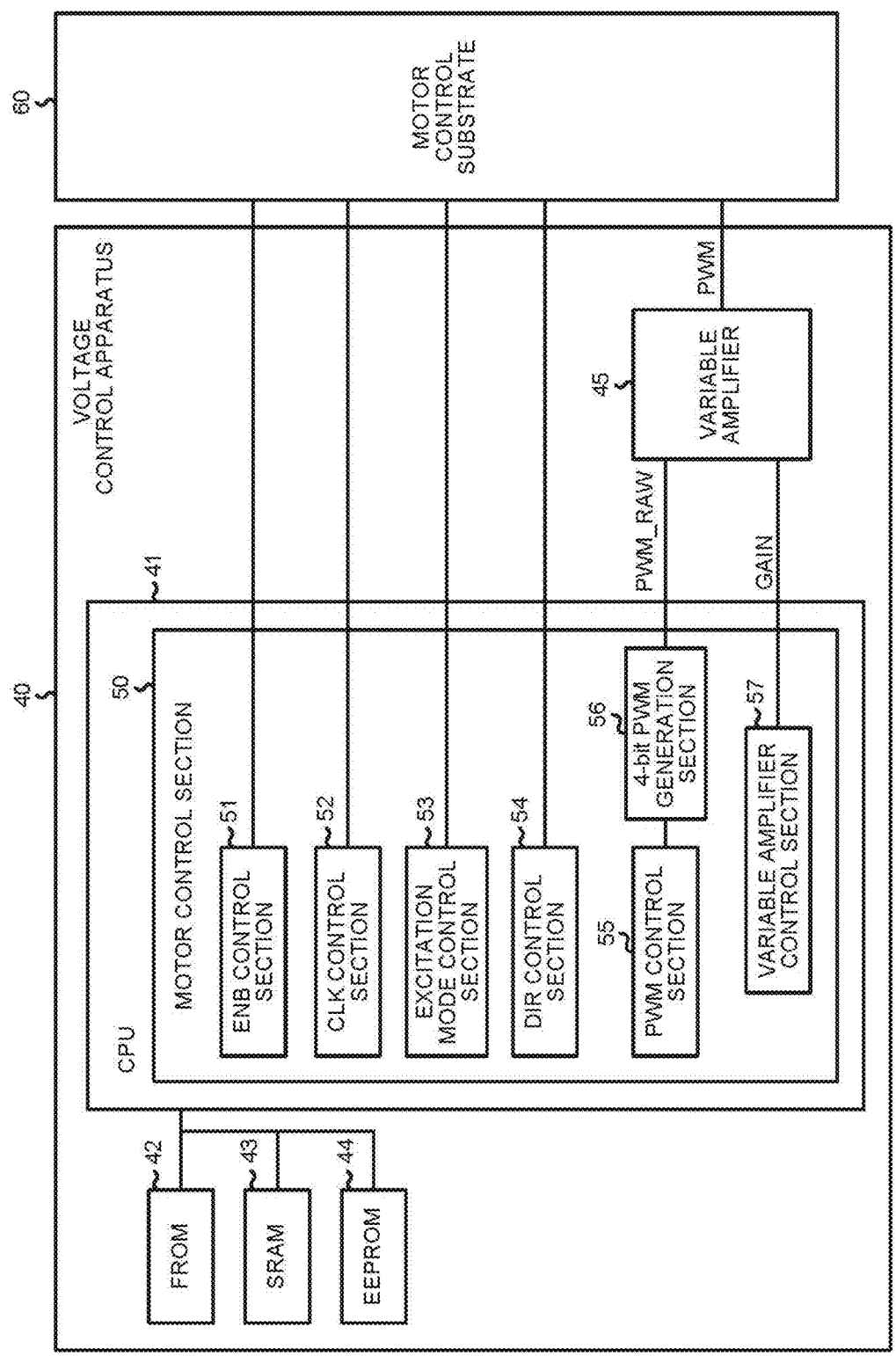
FIG. 3 is a block diagram illustrating a configuration example of a voltage control section according to the embodiment.

FIG. 3 is a block diagram illustrating a configuration example of the voltage control apparatus 40.

As shown in FIG. 3, the voltage control apparatus 40 comprises a CPU 41, a FROM 42, a SRAM 43, an EEPROM 44 and a variable amplifier 45.

The CPU 41 having a function of controlling the whole operations of the voltage control apparatus 40 may comprise an internal cache and various interfaces. The CPU 41 carries out various processing by executing the programs pre-stored in the FROM 42 or EEPROM 44 on the internal cache or the SRAM 43.

The CPU 41 outputs a PWM_RAW wave to the variable amplifier 45. Further, the CPU 41 outputs a GAIN signal for amplifying/reducing (scaling up/down) the PWM_RAW wave to the variable amplifier 45.

The processing realized by the CPU 41 will be described in detail later.

The FROM (flash memory ROM) 42, which is a non-volatile memory capable of writing or rewriting data, stores control programs, applications and various data according to the use purpose of the voltage control apparatus 40.

The SRAM 43 is a volatile memory for temporarily storing the data generated during the processing carried out by the CPU 41. The SRAM 43 stores various application programs according to a command from the CPU 41. Further, the SRAM 43 may store the data needed for the execution of an application program and the execution result of an application program.

The EEPROM 44 is a non-volatile memory capable of writing or rewriting data. The EEPROM 42 stores control programs, applications and various data according to the use purpose of the voltage control apparatus 40.

The variable amplifier 45 amplifies or reduces (scales up/down) the PWM wave (PWM_RAW wave) output from the CPU 41 according to a GAIN signal output from the CPU 41.

For example, the GAIN signal is a signal indicating whether or not to amplify the PWM_RAW wave output from the CPU 41. When the GAIN signal is 'high' (i.e., the GAIN signal indicates the amplification of the PWM wave), the variable amplifier 45 amplifies the PWM_RAW wave at a predetermined magnification and outputs the amplified PWM_RAW wave to the motor control substrate 60 as a PWM wave. Here, it is assumed that the variable amplifier 45 amplifies the PWM_RAW wave by 1.25 times.

When the GAIN signal is 'low' (i.e., the GAIN signal indicates no amplification of the PWM wave), the variable amplifier 45 outputs the PWM_RAW wave to the motor control substrate 60 as a PWM wave without amplifying the PWM_RAW wave.

Further, the variable amplifier 45 may reduce the PWM_RAW wave. For example, when the GAIN signal is 'high' (i.e., the GAIN signal indicates the reduction of the PWM_RAW wave), the variable amplifier 45 reduces the PWM_RAW wave at a predetermined magnification and outputs the reduced PWM_RAW wave to the motor control substrate 60 as a PWM wave.

Further, the variable amplifier 45 may amplify or reduce the PWM_RAW wave at a magnification specified by a GAIN signal. For example, the GAIN signal may indicate a magnification of 0.5, 0.75, 1, 1.25 or 1.5.

A configuration example of the variable amplifier 45 will be described in detail later.

Next, the functions achieved by the CPU 41 are described.

The CPU 41 realizes functions thereof through a motor control section 50.

The motor control section 50 sends various control signals to the motor control substrate 60. Further, the motor control section 50 sends a PWM_RAW wave and a GAIN signal to the variable amplifier 45.

As shown in FIG. 3, the motor control section 50 comprises an ENB control section 51, a CLK control section 52, an excitation mode control section 53, a DIR control section 54, a PWM control section 55, a 4-bit PWM generation section 56 and a variable amplifier control section 57.

The ENB control section 51 generates an ENB signal and sends the generated ENB signal to the motor control substrate 60.

The CLK control section 52 generates a CLK signal and sends the generated CLK signal to the motor control substrate 60.

The excitation mode control section 53 generates a MODE signal and sends the generated MODE signal to the motor control substrate 60.

The DIR control section 54 generates a DIR signal and sends the generated DIR signal to the motor control substrate 60.

The PWM control section 55 (pulse width control section) sends a pulse control signal for generating a PWM_RAW wave to the 4-bit PWM generation section 56. The PWM control section 55 specifies the pulse width of the PWM_RAW wave using a 4-bit signal. For example, the PWM control section 55 may divide the maximum pulse width into 16 parts taking width of each part as a unit and specifies the number of units by 4-bit. For example, when the PWM control section 55 specifies '5', the 4-bit PWM generation section 56 generates a PWM_RAW wave having a pulse width equal to 5/16 of the maximum pulse width.

The 4-bit PWM generation section 56 (pulse width modulation wave generation section) generates a PWM_RAW wave according to a pulse control signal sent from the PWM control section 55. As stated above, the pulse control signal is the number of units specified using 4-bit. Thus, the 4-bit PWM generation section 56 generates a PWM_RAW wave having a pulse width corresponding to the number of units specified by the pulse control signal. The 4-bit PWM generation section 56 sends the generated PWM_RAW wave to the variable amplifier 45.

The variable amplifier control section 57 generates a GAIN signal for amplifying a PWM wave. The variable amplifier control section 57 generates a GAIN signal according to the value of a needed reference voltage Vref. That is, the variable amplifier control section 57 generates a GAIN signal to generate a needed reference voltage Vref by scaling up/down a PWM_RAW wave.

For example, when the reference voltage Vref which is unachievable in the pulse width specified by 4-bit is needed, the variable amplifier control section 57 generates a GAIN signal. That is, when a detailed adjustment which cannot be designated by 4-bit is needed, the variable amplifier control section 57 generates a GAIN signal and adjusts the reference voltage Vref in detail.

Further, the PWM control section 55 may be integrated with the 4-bit PWM generation section 56.

The CPU 41 realizes each aforementioned function by executing a program on the SRAM 43.

Further, each function achieved by the CPU 41 can also be achieved by a piece of hardware. In this case, the CPU 41 may control the operations of the hardware.

Sequentially, the variable amplifier 45 is described below.

The variable amplifier 45 scales up/down a PWM_RAW wave according to a GAIN signal and outputs the scaled up/down PWM_RAW wave as a PWM wave.

As stated above, the variable amplifier 45 may amplify a PWM_RAM wave by 1.25 times according to a GAIN signal.

Figure 4:
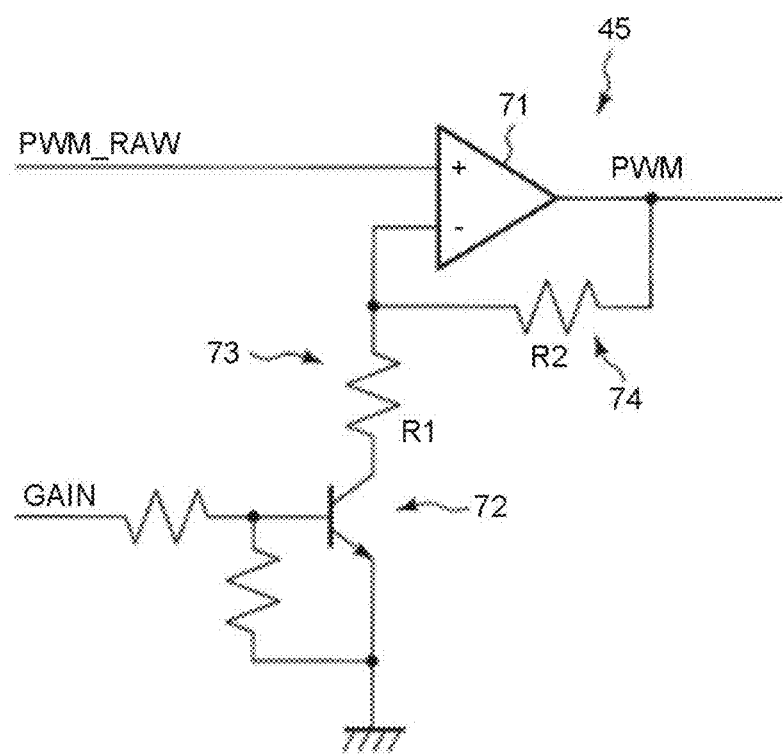
FIG. 4 is a block diagram illustrating a configuration example of a variable amplifier according to the embodiment.

FIG. 4 is a block diagram illustrating a configuration example of the variable amplifier 45.

As shown in FIG. 4, the variable amplifier 45 comprises an operational amplifier 71, a transistor 72, a resistor 73 and a resistor 74.

A PWM_RAW wave is input to the positive input terminal of the operational amplifier 71. Further, the negative input terminal of the operational amplifier 71 is connected to the ground via the resistor 73 and the transistor 72.

Further, the output terminal of the operational amplifier 71 is connected with the negative input terminal (negative feedback) of the operational amplifier 71 via the resistor 74.

A GAIN signal is input to the base terminal of the transistor 72.

Further, the resistor 73 has a resistance R1 and a resistance R2. Here, the ratio of R2 to R1 is 0.25.

When the GAIN signal is 'low', the transistor 72 insulates the resistor 73 from the ground. Consequently, the operational amplifier 71 does not amplify the PWM_RAW wave. That is, the operational amplifier 71 outputs, from the output terminal thereof, the PWM_RAW wave as PWM wave without changing the PWM_RAW wave.

When the GAIN signal is 'high', the transistor 72 electrically connects the resistor 73 with the ground. Consequentially, the operational amplifier 71 amplifies the PWM_RAW wave. The operational amplifier 71 amplifies PWM_RAW wave by (1+R2/R1) times. Here, as the ratio of R2 to R1 is 0.25, the operational amplifier 71 amplifies the PWM_RAW wave by 1.25 times.

That is, the operational amplifier 71 amplifies the PWM_RAW wave by 1.25 times and outputs, from the output terminal thereof, the amplified PWM_RAW wave as a PWM wave.

Further, the variable amplifier 45 can be any of structure or constitution that is capable of scaling up/down a PWM_RAW wave according to a GAIN signal but is not limited to a specific circuit or structure.

Next, the operation examples of the motor unit 6 are described.

Figure 5:
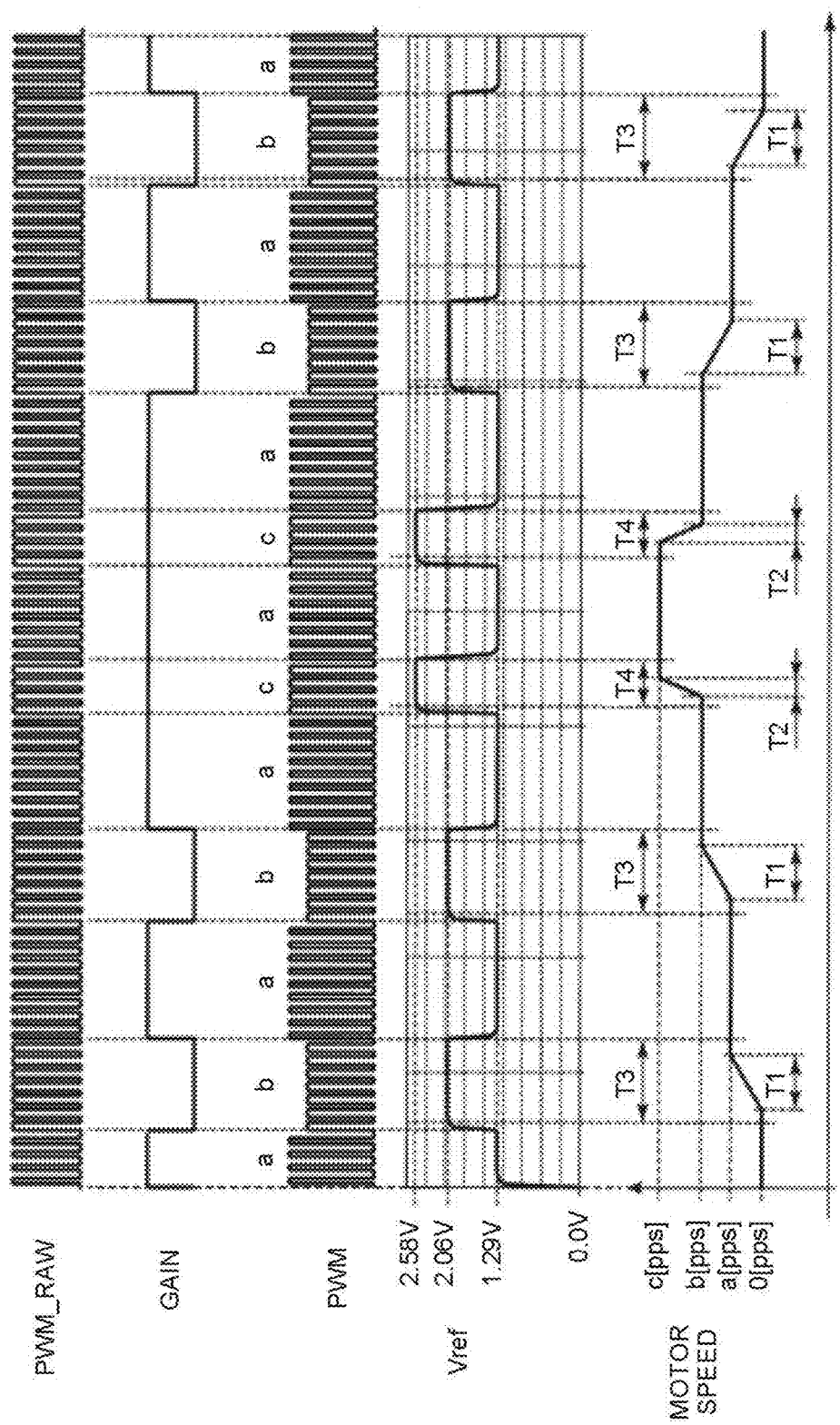
FIG. 5 is a timing diagram illustrating examples of each signal according to the embodiment.

FIG. 5 is a timing chart illustrating the PWM and the like output from the voltage control apparatus 40.

FIG. 5 illustrates a PWM_RAW wave, a GAIN signal, PWM waves a-c, a reference voltage Vref and the rotation speed of a motor.

Here, as a PWM wave, the voltage control apparatus 40 outputs a PWM wave a, a PWM wave b or a PWM wave c.

The pulse width of the PWM wave a is smaller than those of the PWM waves b and c, and the pulse width of the PWM wave b is equal to that of the PWM wave c.

Further, the amplitude of the PWM wave a is greater than that of the PWM wave b but equal to that of the PWM wave c. Further, the 4-bit PWM generation section 56 of the voltage control apparatus 40 is assumed to generate a PWM_RAW wave the amplitude of which is 3.3V.

The voltage control apparatus 40 outputs the PWM wave a when the rotation speed of the motor is fixed.

When the voltage control apparatus 40 outputs the PWM wave a, the PWM control section 55 sends a pulse control signal representing '5' as the number of units to the 4-bit PWM generation section 56.

The 4-bit PWM generation section 56 receives the pulse control signal representing '5' as the number of units. When the pulse control signal is received, the 4-bit PWM generation section 56 outputs a PWM_RAW wave the pulse width of which is equal to 5/16 of the maximum width to the variable amplifier 45.

Further, when the voltage control apparatus 40 outputs the PWM wave a, the variable amplifier control section 57 outputs 'high' as a GAIN signal to the variable amplifier 45.

The variable amplifier 45 receives the PWM_RAW wave output from the 4-bit PWM generation section 56 and the GAIN signal output from the variable amplifier control section 57. As the GAIN signal is 'high', the variable amplifier control section 57 amplifies the PWM_RAW wave by 1.25 times. That is, the variable amplifier 45 amplifies the amplitude of the PWM_RAW wave to 4.125V (3.3V*1.25).

The variable amplifier 45 outputs the amplified PWM_RAW wave to the motor control substrate 60 as the PWM wave a.

The low-pass filter 61 of the motor control substrate receives the PWM wave a output by the variable amplifier 45, smooths the received PWM wave a and outputs the smoothed PWM wave a to the motor driver 62. That is, the low-pass filter 61 outputs a voltage of 1.29V (4.125*5/16) to the motor driver 62 as a reference voltage Vref.

The motor driver 62 sets a current value corresponding to the output reference voltage Vref (1.29V) as the current flowing to each phase of the motor 70.

Further, the voltage control apparatus 40 outputs the PWM wave b during a T3 period which includes a T1 period during which the motor 70 accelerates or decelerates slowly and the periods prior to and following the T1 period. That is, the voltage control apparatus 40 outputs the PWM wave b in the period during which the motor 70 accelerates or decelerates slowly and the periods prior to and following T1 period.

When the voltage control apparatus 40 outputs the PWM wave b, the PWM control section 55 sends a pulse control signal representing '10' as the number of units to the 4-bit PWM generation section 56.

The 4-bit PWM generation section 56 receives the pulse control signal representing '10' as the number of units. When the pulse control signal is received, the 4-bit PWM generation section 56 outputs a PWM_RAW wave the pulse width of which is equal to 10/16 of the maximum width to the variable amplifier 45.

Further, when the voltage control apparatus 40 outputs the PWM wave b, the variable amplifier control section 57 outputs 'low' as a GAIN signal to the variable amplifier 45.

The variable amplifier 45 receives the PWM_RAW wave output from the 4-bit PWM generation section 56 and the GAIN signal output from the variable amplifier control section 57. As the GAIN signal is 'low', the variable amplifier control section 57 does not amplify the PWM_RAW wave.

The variable amplifier 45 outputs the PWM_RAW wave to the motor control substrate 60 as the PWM wave b without changing the PWM_RAW wave.

The low-pass filter 61 of the motor control substrate 60 receives the PWM wave b output from the variable amplifier 45, smooths the received PWM wave b and outputs the smoothed PWM wave b to the motor driver 62. That is, the low-pass filter 61 outputs a voltage of 2.06V (3.3*10/16) to the motor driver 62 as a reference voltage Vref.

The motor driver 62 sets a current value corresponding to the output reference voltage Vref (2.06V) as the current flowing to each phase of the motor 70.

Further, the voltage control apparatus 40 outputs the PWM wave c during a T4 period which includes a T2 period during which the motor 70 accelerates or decelerates sharply and the periods prior to and following the T2 period. That is, the voltage control apparatus 40 outputs the PWM wave c in the period during which the motor 70 accelerates or decelerates sharply and the periods prior to and following the T2 period.

When the voltage control apparatus 40 outputs the PWM wave c, the PWM control section 55 sends a pulse control signal representing '10' as the number of units to the 4-bit PWM generation section 56.

The 4-bit PWM generation section 56 receives the pulse control signal representing '10' as the number of units. When the pulse control signal is received, the 4-bit PWM generation section 56 outputs a PWM_RAW wave the pulse width of which is equal to 10/16 of the maximum width to the variable amplifier 45.

Further, when the voltage control apparatus 40 outputs the PWM wave c, the variable amplifier control section 57 outputs 'high' as a GAIN signal to the variable amplifier 45.

The variable amplifier 45 receives the PWM_RAW wave output from the 4-bit PWM generation section 56 and the GAIN signal output from the variable amplifier control section 57. As the GAIN signal is 'high', the variable amplifier control section 57 amplifies the PWM_RAW wave by 1.25 times. That is, the variable amplifier 45 amplifies the amplitude of the PWM_RAW wave to 4.125V (3.3V*1.25).

The variable amplifier 45 outputs the amplified PWM_RAW wave to the motor control substrate 60 as the PWM wave c.

The low-pass filter 61 of the motor control substrate receives the PWM wave c output by the variable amplifier 45, smooths the received PWM wave c and outputs the smoothed PWM wave c to the motor driver 62. That is, the low-pass filter 61 outputs a voltage of 2.58V (4.125*$^{10}/_{16}$) to the motor driver 62 as a reference voltage Vref.

The motor driver 62 sets a current value corresponding to the output reference voltage Vref (2.58V) as the current flowing to each phase of the motor 70.

Further, the variable amplifier control section 57 may output a GAIN signal to the variable amplifier 45 before the 4-bit PWM generation section 56 generates a PWM_RAW wave.

Next, a PWM wave which can be output by the voltage control apparatus 40 is described below.

Figure 6:
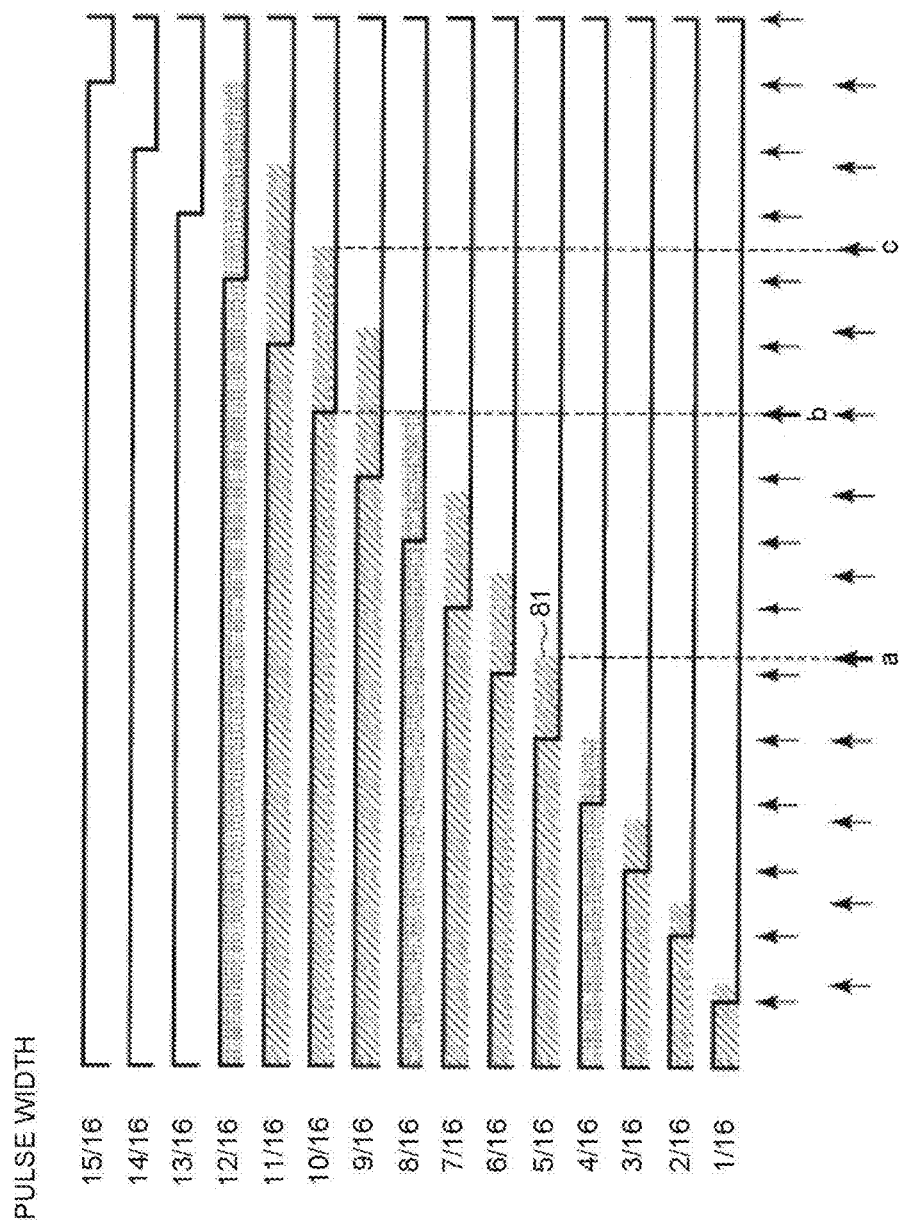
FIG. 6 is a diagram illustrating an example of a PWM wave according to the embodiment.

FIG. 6 is a diagram illustrating a PWM wave that can be output by the voltage control apparatus 40.

In FIG. 6, the line indicated by a solid line represents a PWM wave obtained when a PWM_RAW wave is not amplified by the variable amplifier 45. The upper arrow represents a pulse width generated without using the amplification of the variable amplifier 45.

The area indicated by oblique lines or dots represents, without the amplification of the variable amplifier 45, the pulse width needed for the generation of a reference voltage Vref which is generated when the PWM_RAW wave is amplified by the variable amplifier 45.

That is, by amplifying a PWM_RAW wave using the variable amplifier 45, an effect the same as the generation of the pulse width in the area indicated by the oblique lines or dots can be obtained.

The lower arrow represents a pulse width corresponding to the PWM generated by using the amplification of the variable amplifier 45.

The area indicated by oblique lines represents a pulse width corresponding to the reference voltage Vref which can be newly generated through the amplification of the variable amplifier 45.

The area indicated by dots represents a pulse width corresponding to the reference voltage Vref which can be generated even if without using the amplification of the variable amplifier 45.

For example, the PWM wave a is the PWM wave having the width shown in the area 81. That is, the reference voltage Vref (1.29V) generated by the PWM wave a is accordant with the reference voltage Vref generated by a PWM wave having the width shown in the area 81. Thus, when a PWM_RAW wave having a pulse width equal to $^5/_{16}$ of the maximum width is generated, the voltage control apparatus 40 can activate the motor control substrate 60 to generate the reference voltage Vref (1.29V) again by amplifying the PWM_RAW wave using the variable amplifier 45.

As shown in FIG. 6, the voltage control apparatus 40 is capable of activating the motor control substrate 60 to generate 16 kinds of reference voltages Vref without using the variable amplifier 45. The voltage control apparatus 40 is capable of activating the motor control substrate 60 to generate 24 kinds of reference voltages Vref using the variable amplifier 45.

Further, the variable amplifier 45 may also be arranged between the low-pass filter 61 and the motor driver 62.

The voltage control apparatus having the aforementioned structure is capable of amplifying the amplitude voltage of a generated PWM wave. Consequentially, the voltage control apparatus can control a voltage more in detail without increasing the number of bits of a signal for controlling the pulse width of a PWM wave. Thus, the voltage control apparatus is capable of controlling a voltage effectively.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A voltage control apparatus for generating a pulse width modulation wave, comprising:
    a pulse width control section configured to specify the pulse width of the pulse width modulation wave using an n-bit signal;
    a pulse width modulation wave generation section configured to generate a pulse width modulation wave having the pulse width specified by the pulse width control section;
    a variable amplifier control section configured to generate a GAIN signal for scaling up or down a voltage of the pulse width modulation wave generated by the pulse width modulation wave generation section; and
    a variable amplifier configured to scale up or down the voltage of the pulse width modulation wave generated by the pulse width modulation wave generation section according to the GAIN signal generated by the variable amplifier control section and output the pulse width modulation wave whose voltage is scaled up or down, wherein
    the GAIN signal is a signal for indicating whether or not to amplify the voltage of the pulse width modulation wave;
    the variable amplifier amplifies the voltage of the pulse width modulation wave when the GAIN signal indicates the amplification of the voltage of the pulse width modulation wave;
    the GAIN signal is 'high' or 'low';
    the variable amplifier amplifies the voltage of the pulse width modulation wave when the GAIN signal is 'high'; and
    the variable amplifier comprises:
        an operational amplifier configured to amplify the pulse width modulation wave; and
        a transistor configured to electrically connect a terminal of the operational amplifier with the ground when the GAIN signal is 'high' or to insulate the terminal of the operational amplifier from the ground when the GAIN signal is 'low'.

2. The voltage control apparatus according to claim 1, wherein
    the pulse width control section specifies the pulse width of the pulse width modulation wave using a 4-bit signal.

3. A motor unit, comprising:
    the voltage control apparatus according to claim 1;
    a motor driver configured to output a current according to the pulse width modulation wave output from the voltage control apparatus; and a motor driven by the current output from the motor driver.

4. The motor unit according to claim 3, comprising:
a low-pass filter for smoothing the pulse width modulation wave; wherein
the motor driver outputs a current according to the pulse width modulation wave smoothed by the low-pass filter.

5. The motor unit according to claim 3, wherein
the motor is a stepping motor.

6. An image forming apparatus for forming an image on a paper, comprising:
the motor unit according to claim 3.

7. A voltage control method for generating a pulse width modulation wave, comprising:
specifying the pulse width of the pulse width modulation wave using an n-bit signal;
generating a pulse width modulation wave having the specified pulse width;
generating a GAIN signal for scaling up or down a voltage of the generated pulse width modulation wave; and
scaling up or down the voltage of the generated pulse width modulation wave according to the generated GAIN signal and outputting the pulse width modulation wave whose voltage is scaled up or down, wherein
the GAIN signal is a signal indicating whether or not to amplify the voltage of the pulse width modulation wave;
the scaling is scaling up or down the voltage of the generated pulse width modulation wave when the GAIN signal is 'high'; and
the variable amplifier comprises:
an operational amplifier configured to amplify the pulse width modulation wave; and
a transistor configured to electrically connect a terminal of the operational amplifier with the ground when the GAIN signal is 'high' or to insulate the terminal of the operational amplifier from the ground when the GAIN signal is 'low'.

* * * * *